Aug. 25, 1942.   G. S. LANE   2,293,836
BRAKE ADJUSTER
Filed May 12, 1941   2 Sheets-Sheet 1

INVENTOR
GEORGE S. LANE
BY
ATTORNEYS

Aug. 25, 1942.　　　　G. S. LANE　　　　2,293,836
BRAKE ADJUSTER
Filed May 12, 1941　　　　2 Sheets-Sheet 2
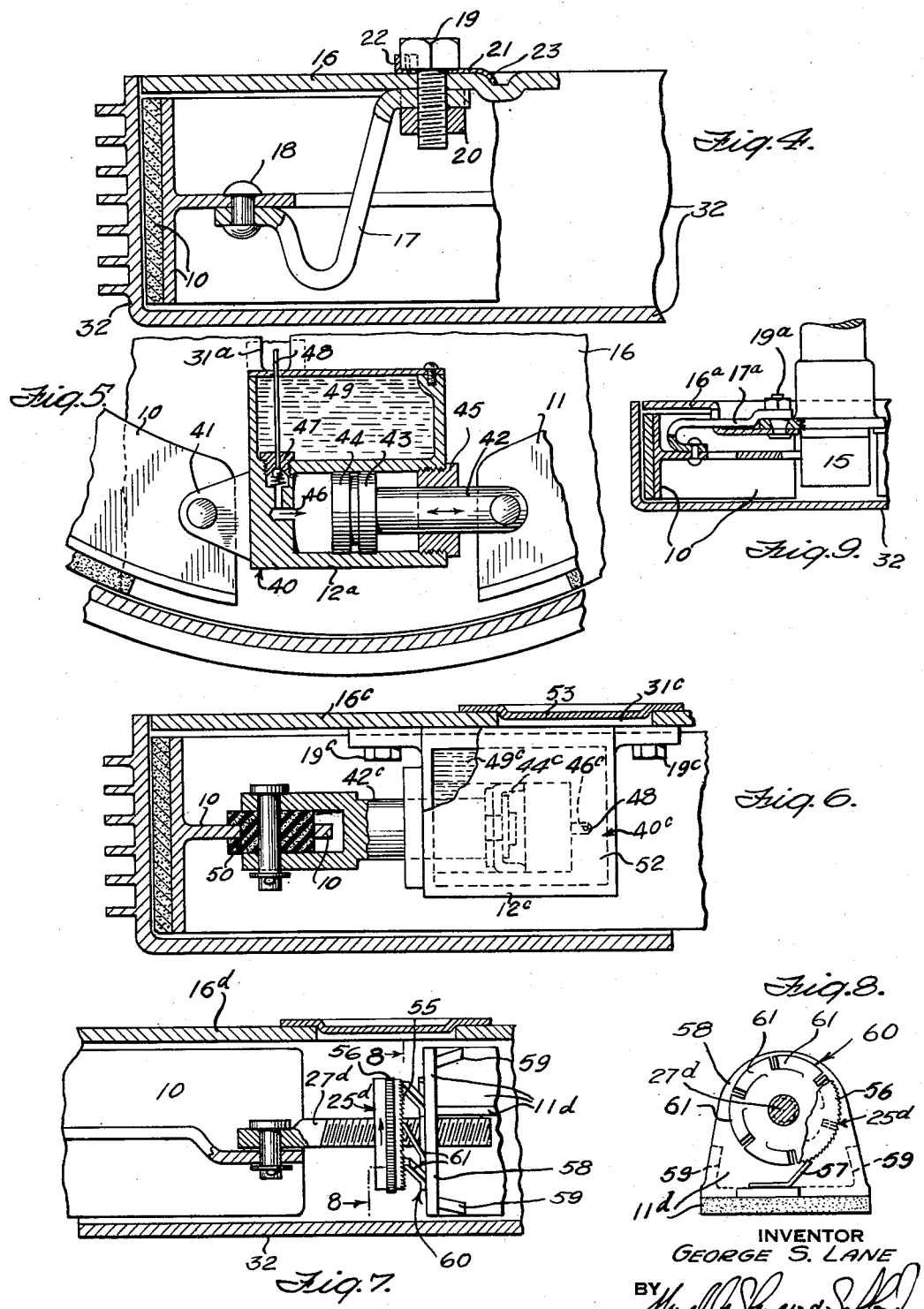
INVENTOR
GEORGE S. LANE Patented Aug. 25, 1942

2,293,836

UNITED STATES PATENT OFFICE 2,293,836

BRAKE ADJUSTER

George S. Lane, Yarmouth, Maine

Application May 12, 1941, Serial No. 393,069

12 Claims. (Cl. 188—79.5)

This invention relates to brakes and more particularly to automatically adjusting braking systems.

Automobiles are often driven over long periods of time and with thousands of stops without adjustment of the braking system. Due to wear of the brake lining the brake operation may come gradually closer to the limit of the available operating range without the driver of the car becoming aware of the impending limitation, since there may have been no apparent change in effectiveness over the long period of time during which this wear has occurred. The latent danger of such a condition, however, may become suddenly very real when a sudden stop is required from high speed, or a number of stops are required in quick succession, or where braking is required on a long down grade. The heating of the drum with resultant thermal expansion thereof in such cases plus the additional wear encountered may result in the drums expanding beyond the limit of pedal operation available with the existing adjustment; as a consequence of which the brake shoes cannot be held against the drum with sufficient pressure to successfully stop the car.

I have already described and claimed in my prior Patent No. 2,196,396, a device for determining the clearance of a brake by the limited elastic return of a member which is stretched beyond its elastic limit by every increment of movement due to wear.

One object of my present invention is to provide for the automatic adjustment of brakes of the floating split-ring type wherein motors of relatively short travel are used and the ends of the shoes adjacent the operating motor are returned after each stroke into contact with a fixed anchor.

Another object of my invention is to automatically expand the ring of an expanding ring type of brake so as to maintain a predetermined clearance from the brake drum when the ends of the split brake ring are retracted onto the anchor.

Other objects and advantages will be apparent from the following specification and the accompanying drawings.

In the accompanying drawings, I have shown a preferred embodiment of my invention by which these objects are attained. In selecting and presenting these drawings and the various modifications suggested in this application, it should be understood that there is no intention that these should be exhaustive or limiting of the invention; but on the contrary they are given with a view to illustrating the invention and explaining the principles thereof and the best manner of embodying the same in use, in order that others may fully understand the same and may be enabled to embody the invention in numerous other forms and with numerous other modifications, each as may be best adapted to conditions of their particular use.

Referring to these drawings:

Fig. 4 is a fragmentary sectional view taken on lines 4—4 of Fig. 1;

Fig. 5 is a fragmentary view similar to that of the bottom of Fig. 1, but showing a modified form of the invention;

Fig. 6 is a view similar to Fig. 4, but showing a modified form of the invention;

Fig. 7 is a view similar to Fig. 3, showing a modified form of the invention;

Fig. 8 is a view taken on line 8—8 of Fig. 7; and

Fig. 9 is a view similar to Fig. 4, but showing another modified form of the invention.

Figure 1:
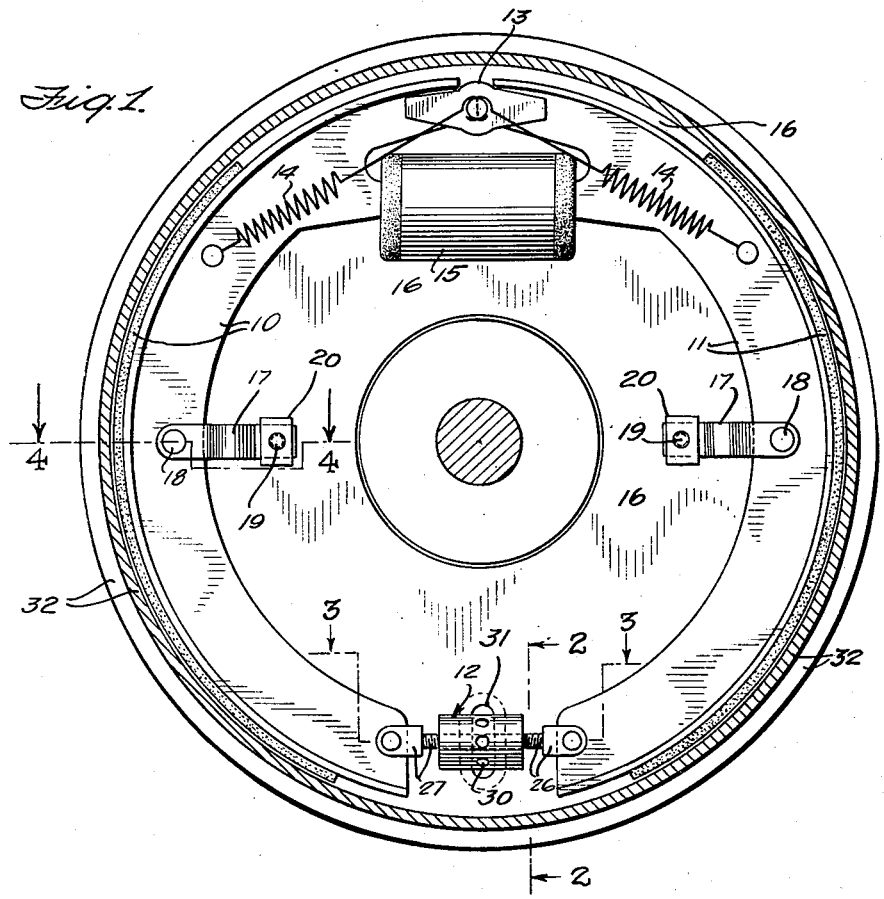
Fig. 1 is a view partly in section, partly in elevation showing a brake mechanism applied to the wheel and backing plate on the axle of an automobile.

Referring first to Figs. 1 to 4 inclusive, the brake there shown in its essential outline is similar to that used on standard automobiles manufactured by the General Motors Corporation, in that it uses approximately semi-circular shoes 10, 11, connected at the lower end by a turn-buckle 12 and abutting at the upper end against a fixed anchor 13, to which they are resiliently held by springs 14 and from which they are forced when the brakes are applied by the hydraulic cylinder or brake operating motor 15, secured to the frame, e. g., the backing plate 16 on the axle housing. The brake system shown differs from that of the standard General Motors type brake first in the nature of the turn-buckle 12 and secondly in substituting for the usual type centering or damping devices, a special link 17 of limited resiliency.

As most clearly shown in Fig. 4, the links 17 are formed with loops to facilitate bending and resilient retraction of the shoe, and are fastened at one end to the web of the brake shoe, e. g., by riveting at 18 and at the opposite ends are bolted to the backing plate 16 by means of the bolt 19 and the saddle nut 20 cut out to fit over and engage the sides of the link 17 as most clearly shown in Fig. 1, or otherwise secured to the end of the link 17 or to the backing plate 16 against rotation so that the bolt 19 may be removed from the outside. A locking washer 21 is shown in this case provided with ears 22 turned up against the side of the bolt 19 and another ear 23 turned down into the groove in the backing plate as shown, to prevent accidental loosening of the bolt 19.

Figure 3:
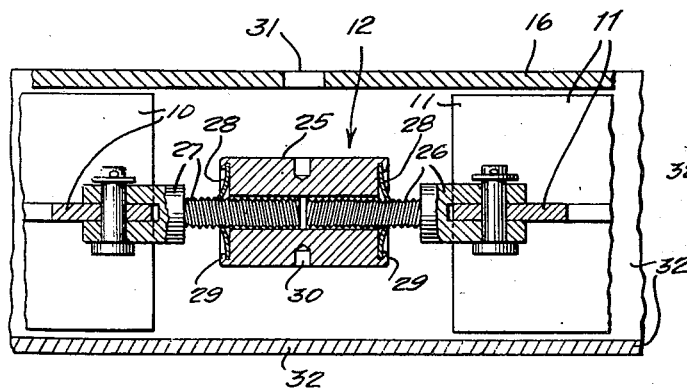
Fig. 3 is a fragmentary sectional view taken on lines 3—3 of Fig. 1.

The turn-buckle 12, in the example illustrated, is especially constructed as shown in Fig. 3, in that the central member 25 is not threaded, but is provided with a smooth bore closely fitted to the outside diameter of the threaded bolts 26, 27. At each end this central member 25 is provided with a resilient slitted washer 28 secured thereto by swedging an edge over the edge of the washer as shown at 29. The washer is provided with outwardly directed slits extending from the central opening, as clearly shown in Fig. 2, so that its central portion around the opening is divided into resilient fingers, each of which engages a segment of the threaded rods 26, 27. Spaced holes 30 are provided in the periphery of the member 25 and an opening 31 is made in the back plate 16 provided with a suitable removable cover, so that if it should be desired at any time to loosen the adjustment of the brake or to retract the brake preparatory to dis-assembly this can be done from the outside by insertion of a tool into the holes 30 through the opening 31 and rotating the member 25 with the fingers of the washer 28 engaging in the threads of the clevis bolts.

Although, in order to make the drawings more readable, I have shown the resilient washers 28 of single thickness and the threads on the clevis bolts 26, 27, relatively coarse, I prefer in practice to laminate the washers 28 from thin disks of high stiffness, high tensile and high shear resistance metal, for example, stainless steel or beryllium bronze, so as to increase their flexibility and to enable them to engage in finer threads, and then to use a much finer thread than shown on the clevis bolts so that smaller increments of extension may be satisfactorily held and with less lost motion. The size of the central openings in the discs 29 should advantageously be slightly smaller than the size of the rods 26, 27, measured at the base of the threads, so that, under the pressure imposed during a full braking operation, the washer is almost completely flattened against the supporting face of the member 25 but still retains enough curve near the center so that the stress on the washer is chiefly compressive. It is also desirable that the spring fingers between the slits should include a sufficiently wide arc to give the finger a transverse curvature as it is pushed down into the thread of the rod 26 or 27, thus increasing the stiffness under compression as compared with the action when the rod 26 or 27 is being drawn out, when maximum flexibility is desirable.

It will be understood, of course, that I may use smooth rods instead of the threaded rods 26, 27, which would be engaged by the spring plates to form a so-called "silent ratchet," but in general the positive action of the threaded rods which permit the use of lighter and more flexible springs with less force required for readjustment and consequently less lost-motion in operation, and the ability to back-off by turning the member 25 like a nut, will more than justify the use of threaded bolts.

In the operation of this device, assuming first that the brake is in proper adjustment, an application of pressure to the liquid in the motor cylinder 15 will expand the pistons of this motor against the shoes 10, 11 and thus will press the shoes away from the anchor 13 into engagement with the drum 32. As soon as this occurs a "servo" or self-energizing action begins. That is to say, the drag of the friction lining against the rotating drum produces a circumferential compression in the shoe which tends to spread the ring and thus the frictional drag is added to the expanding pressure of the brake operating motor 15.

As this longitudinal compression developed in the shoe 10 is transmitted through the clevis bolts 27 and 26 and the central member 25 with its end washers 28 to the shoe 11 and through it in turn to the anchor 13; the threads of the clevis bolt 27 in engagement with the resilient fingers of the washer 28 tend to flatten the washer against the end of the block 25 and at the same time, of course, produce a radial compressive stress in the washer itself which grips the threaded bolt 27 the more tightly. Likewise, at the opposite end the pressure on the block 25 against the washer 28 which is in engagement with the threads of the clevis bolt 26 causes a similar compression and similar increased engagement and thus the full force is transmitted solidly between the two shoes.

When the brake operation is completed and the pressure is relaxed in the cylinder 15, the retracting springs 14 pull the ends of the shoes back against the anchor 13 while the centering links 17 at first pull the middle of each shoe out of engagement with the drum and then yield beyond their neutral points under the pull of the springs 14 until the shoes are retracted to a predetermined clearance from the drum. Assuming that no wear has occurred this is all that happens. It is entirely a resilient extension and retraction.

Assuming, however, that there has been substantial wear of the lining so that, in this brake operation, the shoes have moved to a more extended position than had previously been reached, in such case the links 17 would come into play with an additional function.

These links when first installed are of such a length that they hold the shoes 10 and 11 respectively at an excessive clearance from the drum 32, and they are carefully manufactured to have a limited elastic distortion, from their normal condition of equilibrium with the springs 14, equal only to the proper clearance from the drum. Thus, on the first application of the brake, these links 17 will have been stretched beyond their elastic limits and from the new position of full operation they will have a limited return corresponding to a desired clearance. Since the elastic limit position will have been moved farther out radially than in the last position held, the upper ends of the shoes may not come back into contact with the anchor 13 before the resistance of the links 17 to further compression is sufficient to overcome the grip of the spring washers 28, and thus results in prying apart the lower ends of the shoes; thus a readjustment occurs. The links 17 are compressed to a definite extent corresponding to the desired clearance and thereupon the shoes are rocked on the links 17 as fulcrums, the spring washers 28 yield and allow the threaded clevice bolts 26 and 27 to slip through them with a ratchet action until the upper ends of the shoes contact with the fixed anchor 13. When the brakes are next operated the extension thus attained in the turn-buckle 12 is held by the washers 28 compressing into the threads of the clevice bolts 26 and 27 and bracing them against the ends of the block 25. Thus, the ring formed of the shoes 10 and 11 and the turn-buckle 12 is of a greater effective circumference than before, and the full operation of the brakes is reached at the proper point in the movement of the piston within the brake operating motor 15, and consequently at the proper point in the movement of the brake pedal. Because no part of the pedal and motor action need be reserved for accumulated wear, a greater clearance is permissible which will take care of the lost-motion resulting from compression of the washers 28 and also of any possible differences of thermal expansion in the various parts.

Whenever wear occurs so that the shoes move to a more extended position during brake operation this process is repeated, the clevice bolts 26, 27 are drawn out further and the effective circumference of the ring is further increased.

From what has been said above, it will be understood that with each substantial increment of wear the links 17 will be bent a corresponding amount beyond their previously existing elastic limits, producing a permanent stretch, advancing the equilibrium positions to which they return; and thus a corresponding adjustment of the turn-buckle 12 will be made to compensate for the wear, and this will continue throughout the life of the lining so that the brakes will always be maintained in proper adjustment and ready for immediate use with full amplitude of operation available from the motor 15.

With the links 17 positioned as shown, the clearance at the ends of the shoe may increase slightly as the lining wears. If it is desired to take up more of this clearance (which would require that the clearance at the middle of the shoe decrease) it is only necessary to move the links 17 closer to the anchor 13; and conversely if it is desired to increase the clearance the links may be moved toward the ratchet 12.

If, by reason of heat developed in the brakes on a long grade or a sudden stop from high speed, the drums should expand excessively and the brakes should be applied while the drums are thus heated, the brake shoes 10 and 11, may be moved beyond the normal limits of their movement and to a position which would only be reached in normal operation after substantially greater wear. In this condition an adjustment preferably should not be made. My experience has indicated that in most brakes this will be taken care of automatically by a simultaneous heating of the bending links 17 with the consequence that these, by thermal expansion, extend their limits of elasticity at least to correspond with the extended position of the shoes. This, however, should be carefully considered for each brake design and the links 17 should be designed to achieve this result. If it is not achieved using a low expansion material, such for example, as nickel steel or Monel, which I have found satisfactory in my installations, a higher expansion material, such as aluminum, may be used or metals and alloys of intermediate expansion may be chosen. If it is not convenient to design thus to avoid over-adjustment on thermal expansion it is entirely feasible to make the normal clearance large enough so that it absorbs any such over-adjustment, merely reducing, without entirely eliminating the clearance.

In any case, no matter how well designed these links may be with reference to the particular brake system, there may always be under some conditions a differential expansion or contraction between the drum and the links 17 such that the effective clearance between the drum and the brake shoes 10, 11 may be increased or reduced. The maximum amount of such differential expansion or contraction which may occur in any given case must be taken into consideration in the design of the brake operating system and in determining normal clearance. The normal clearance should be sufficient to accommodate these maximum variations without drag and the brake operating system must be adapted to give full operation with the maximum clearance which may be present under these conditions of differential expansion or contraction.

Aside from this property of thermal expansion, the choice of the particular material for the bending links 17 will depend primarily upon obtaining the desired resilient return with the limited elastic movement such that the elastic limit will be reached always at the position of normal maximum operation. I have found, however, that these links 17 when used, for example, as shown in Figs. 1 and 4, may serve an important additional purpose for holding the brakes steady and centered when released, and also for damping resonant vibrations, especialy to prevent "squeal"; and for this function the stiffness of the material used for the links is important, as it will determine the resonant frequency of the system. With aluminum or with magnesium (Dow metal) and with Monel metal, for example, I have found a satisfactory damping effect. With Monel, I prefer to use a soft grade Monel with minimum crystal size, annealed before bending, or hot rolled and annealed after bending. With aluminum, I prefer to use a very pure grade "2SO." A most important consideration in choice of the metal is that it shall not change its characteristics by aging, repeated flexing, temperature variations cr oxidation to which it is subjected in use.

With the bending links 17 connected as shown, it will be evident that these serve also to center the expanding ring shoes 10, 11 within the drum 32 so as to avoid any drag of the brake on the drum. This is assured, since each of the links 17 will have a definite elastic return from the position of full operation and thus will hold the shoes with sufficient clearance and with substantial rigidity for all practical purposes. The usual centering devices may be used in addition to these if desired, but my experience has shown that they are not required and that such links may be used, even without the other features of my invention, as centering devices and/or for prevention of "squeal" as described above.

The embodiment of my invention shown in Figs. 1 to 4, and described above, has the advantage that it is readily subject to manual adjustment in the same way as with the present standard brake construction, namely, by inserting a tool through the opening 31 in the back plate, successively engaging the spaced holes 30 and turning the turn-buckle block 25 in one direction or the other to expand or contract the shoes. This may be used in making an initial adjustment when the brakes are relined or in retracting the brake shoes from the drum if the drums may have become circumferentially grooved to a depth which might cause an interlocking between the brake shoes and the drum due to long wear and failure to reline and particularly because of failure to reline when rivet heads are exposed or by reason of sand or other abrasive entering between the brake lining and the drum. In such case it is a simple matter to retract the shoes as described by rotating the turnbuckle member 25.

When the shoes are relined and links 17 may be bent back to a position which assures adequate clearance and then restored to proper adjustment by merely operating the brake system several times before the car is put into use so as to fully stretch the links 17 back to the position of full adjustment for the particular lining thickness which has been provided. Or the bolts 19 and the rivets 18 may be removed and new bending links provided.

The arrangement shown in Fig. 4, with the bolt 19 engaging a special nut 20 which is prevented from rotation, permits the removal of the bolt 19 and the release of the links 17 from the outside before removing the wheels. This is an advantage in case sand or grooving of drums or any other cause should interlock the brakes with the drums; the brakes thus released may be removed from the car with the drums.

Another arrangement is shown in Fig. 9, which has this advantage and the additional advantage of exposing a part of the link 17a to the same influences of chilling, e. g., by splashing of water, etc., as the drum 32. If the drums should have become heated by severe brake application and then should be drenched by running through a puddle, the cold water may cause a sudden contraction of the drum. This arrangement shown in Fig. 9, exposes the links 17 to the same chilling and thus causes a similar retraction of the brake shoe. This arrangement of the links may also be used without the other features of my present invention and particularly in brake systems of the type described and claimed in my Patent No. 2,196,396. In the case illustrated in Fig. 9, one end of the bending links 17a extends through an opening in the back plate 16a and is bolted to one of the axle flange bolts at 19a. The shape of the bending links 17a in this case is different from that shown in Fig. 4, but its action will be substantially the same.

It should be understood, of course, that an infinite number of other shapes may be chosen within the scope of my invention.

In Figs. 5 and 6, I have shown checked hydraulic cylinder devices for use in place of the links 17 and the ratchet 12. These have the advantage that they are more easily readjusted with less lost-motion while, at the same time, they are very secure and positive in transmission of pressure from shoe to shoe. In Fig. 5, the ratchet 12a is made up of a cylinder block 40 which engages the shoe 10 by a clevice 41. A piston rod 42 is also provided with a clevice by which it engages the shoe 11. The inner end of the piston rod 42 is provided with rubber or leather or other suitable flexible packing rings 43—44, similar to those used on the pistons in the pump and motor elements of the hydraulic brake systems now in use. An annular nut 45 in the end of the cylinder provides a centered bearing for the piston rod 42 while at the same time permitting by its removal the removal of the piston from the cylinder.

A by-pass 46 provided with check valve 47 operable from outside the casing by means of the rod 48 permits access of liquid from the reservoir 49 through the by-pass 46 into the interior of the cylinder. An opening 31a is provided in the backing plate for operating the rod 48 from the exterior of the plate assembly.

Figure 2:
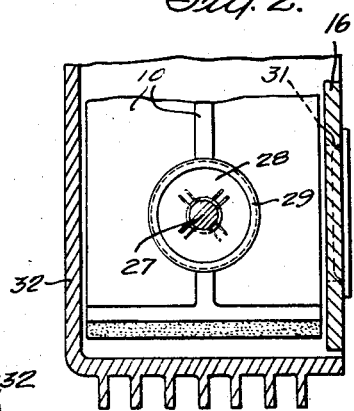
Fig. 2 is a fragmentary sectional view taken on lines 2—2 of Fig. 1.

This hydraulic ratchet 12a may be used in place of the turn-buckle ratchet 12, shown in Figs. 1, 2 and 3, or the silent ratchet suggested above, with substantially the same results; and these several types are illustrative of the numerous ratchet devices which may be chosen. In this case, when the shoes 10 and 11 are pried apart by action of the springs 14 about the fulcrums 18 established by the links 17, the piston rod 42 will be pulled out from the cylinder block 40 and will suck the liquid through the by-pass 46 until the upper ends of the shoes contact the anchor 13. Upon subsequent operation of the brakes, the piston will be prevented from again moving into the cylinder by reason of the check valve 47, and the liquid within the cylinder will constitute a force-transmitting element of the ring 10, 12a, 11.

Referring to Fig. 6, a similar hydraulic ratchet 12c has been used as a link in place of the links 17 shown in Figs. 1 and 4. In this case the piston rod 42c is engaged with the web of the shoe 10 through a compressible washer 50, e. g., of soft rubber, which by reason of its compression, provides the necessary clearance between the shoe and the drum. The piston packing 44c, the check valve by-pass 46c and the cylinder within the block 40c are shown in broken lines in Fig. 6, and in one corner the cover 52 has been broken away to show the interior of the reservoir 49c. The whole assembly 12c is bolted to the backing plate 16c by means of the bolts 19c as shown in Fig. 6. The opening 31c in the backing plate, covered by a suitable removable plate 53, gives access to the device for releasing the check valve by the rod 48.

The operation of this device is substantially the same as that described for the hydraulic ratchet 12a except that in this case each increment of movement of the shoe is not transmitted to the piston rod 42c, because in the normal position of the parts with the brakes released the resilient washer 50 will be compressed to some extent by the action of the springs 14 pulling against the resistance of the ratchet 12, 12a, etc., as the case may be; and the first movement of the shoe, therefore, will relieve this compression. A further movement of the shoe would tend to produce compression on the opposite side of the washer by reason of the frictional resistance of the piston against movement in the cylinder and by reason of the spring pressure on the check valve. These resistances are relatively small in both directions but by suitable choice of the stiffness of the washers 50 they are adequate to determine and assure the desired clearance of the shoe on retraction under the action of the retracting spring 14. If wear has occurred, so that a movement greater than normal takes place, then the pull transmitted through the washer 50 to the piston rod 42c becomes sufficient to overcome resistances imposed upon it and the piston is moved slightly in the cylinder.

In Figs. 7 and 8, I have shown another form of mechanical ratchet which may be used in place of those shown in Figs. 3 and 4 and 5 respectively. In this case the bolt 27d secured to the web of the shoe 10 is threaded as shown and fitted with the threaded nut 25d. As shown in Fig. 7, this nut 25d is provided on one face with ratchet teeth 55 and on its periphery with ratchet teeth 56. Beneath the nut or ratchet wheel 25d and attached to the shoe 11 is a spring detent pawl 57 which engages the ratchet wheel 25d through its peripheral teeth 56 and normally holds it against rotation in a direction which would bring the shoes together. Just beyond the ratchet wheel or nut 25d and integral with the end of the shoe 11d is an abutment 58 welded to the central web of the shoe 11d and further braced by portions 59 welded to the edges of the shoe 11d. On the face of this abutment 58 is a spring washer 60 which has fingers 61 cut out of its periphery and bent towards the ratchet wheel 25d so that each serves as a pawl to engage the teeth 55. When the shoes are pulled apart, due to a stretching of the link 17 as already described, the ratchet wheel 25d is pulled away from the abutment 58 and the fingers 61 resiliently follow the ratchet wheel 25d; but as they bend outwardly they naturally and necessarily curve backward and slip circumferentially over the teeth 55. The several fingers 61 are preferably of length such that they do not engage their respective teeth at the same time, but instead produce a Vernier effect so that a new tooth may be engaged by one of the fingers 61 for each movement corresponding to one-sixth the length of the tooth. Thus, as the fingers 61 slide back across the face of their respective teeth 55, one may drop onto the next tooth. Upon the next operation of the brake, the fingers 61 on the ratchet wheel 25d are pressed against the abutment 58 causing a circumferential extension of these fingers which results in a very small rotation of the wheel 25d. This will occur on each operation of the brake until the shoes are adjusted sufficiently so that the relative movement between the abutment 58 and the wheel 25d is less than sufficient to slide the fingers 61 a distance equivalent to 1/6 of one tooth. When this condition is achieved no further adjustment will occur until sufficient additional wear of the lining has occurred to permit the movement of the fingers 61 over the teeth 55 to exceed 1/6 of the tooth length. To make this effective either the teeth 25d must correspond to 1/6 the angular scope of the teeth 55 or a Vernier effect should be used with the detent, e. g., by using a laminated spring 57 with the laminations adapted to hold a tooth at slightly different positions. Obviously, if desired, smaller teeth may be used, and two or more of the fingers may engage the tooth at the same time, or all of the fingers may engage simultaneously and the movement may be made in greater increments with greater differences in clearance accumulating between operations.

In Fig. 7 the spacing between the washer 60 and the ratchet wheel 25d is exaggerated for greater clarity of showing. This spacing ordinarily will not be more than a few hundredths of an inch at most.

What I claim is:

1. In a brake mechanism of the internal expanding split ring type, an adjusting device which comprises an extensible ratchet in said ring opposite the split therein, resilient retracting means for drawing the ends of the split ring against an abutment and means connecting said ring to a frame at points on each side of the ratchet between said ratchet and said split in the ring, said means having limited elastic yield adapted to accommodate normal operating movement of the ring at said points of connection but to reach the limit of said elastic yield at a position corresponding to full application of the brake and thereby to take a permanent set when moved therebeyond from time to time as wear occurs, and said connecting means having a limited resilient return, whereby after each permanent set the connected points are returned only to a more advanced position at which they serve as fulcrums for the retracting means to pry open the ring at the ratchet and thereby to adjust the ratchet to expand the ring and compensate for wear.

2. In a vehicle brake system of the self-energizing type having a split ring with its ends normally bearing against an anchor and means for expanding the ring against a drum for braking, an automatic adjusting device which comprises an extensible ratchet in said ring opposite the anchor whereby the ring may be expanded to a greater diameter, connecting links secured to a frame and to the ring respectively at each side of, and approximately midway between, the ratchet and the anchor and each having limited elasticity such that they respectively reach their elastic limits at the expansion of the ring required for full brake application and take a permanent set when moved therebeyond, and their normal resilient retraction from said position will approximate, but normally be less than, the maximum desired clearance of the corresponding part of the ring from the drum, and retracting spring means connected to the ends of the ring near said anchor adapted to pull said ends firmly against said anchor when the brake expanding means is released.

3. In a vehicle brake system of the self-energizing type having a split ring with its ends normally bearing against an anchor and means for expanding the ring against a drum for braking, an automatic adjusting device which comprises an extensible ratchet in said ring opposite the anchor whereby the ring may be expanded to a greater diameter, connecting links secured to a frame and to the ring respectively at each side of, and between, the ratchet and the anchor and each having limited elasticity such that they respectively reach their elastic limits at the expansion of the ring required for full brake application and take a permanent set when moved therebeyond, and their normal resilient retraction from said position will approximate, but normally be less than, the maximum desired clearance of the corresponding part of the ring from the drum, and retracting spring means connected to the ends of the ring near said anchor adapted to pull said ends firmly against said anchor when the brake expanding means is released.

4. In a vehicle brake system of the self-energizing type, the combination as defined in claim 3, in which the extensible ratchet comprises a cylinder, a closely fitted piston therein, a reservoir communicating with said cylinder, a liquid filling said cylinder with an excess in said reservoir covering the communication therebetween, and a one-way valve in said communication adapted to admit liquid to the cylinder from said reservoir but to prevent escape of liquid from said cylinder.

5. In a vehicle brake system of the self-energizing type, the combination as defined in claim 3, in which the ring is comprised of segmental shoes, and the extensible ratchet comprises a screw-threaded connection between said shoes, an abutment on at least one of the shoes adapted to transmit circumferential compressive force between one shoe and a screw-threaded member of said connection but free to withdraw a substantial distance in the opposite direction when the shoes are drawn apart, a toothed ratchet wheel connected to said screw-threaded connection and pawls connected to slip over said teeth when the shoes are drawn apart and to engage said teeth to turn said screw-threaded connection when said screw-threaded member and said abutment are subjected to said circumferential compressive force.

6. In a vehicle brake system of the self-energizing type, the combination as defined in claim 3, in which the ring is comprised of segmental shoes, and the extensible ratchet comprises threaded turnbuckle bolts projecting from each shoe toward the other at one end thereof, a block between the ends of said shoes drilled for reception of said bolts and a spring washer secured to each end of said block resiliently embracing said bolts respectively and flexed outward in resilient engagement with the threads of said bolts whereby to permit separation between said shoes by slipping of said washers over the threads with a ratchet action, but to grip said threads solidly for transmission of a compressive force between the shoes.

7. In a vehicle brake system having split ring brake shoes anchored at only one point in the ring, the combination therewith of an elastic link rigidly connected to a frame and to the shoe at a position spaced around the ring from said anchor, and having an elastic yield sufficient to accommodate without permanent deformation the expanding of the ring into engagement with the drum and normal retraction of the ring from the drum, but being sufficiently stiff to hold said ring rigidly positioned against inertial forces to which it may be subjected in use.

8. In a vehicle brake system the combination as defined in claim 7, in which the elastic links are of a material of low stiffness whereby to damp resonant vibrations of the shoes.

9. A brake system of the type having cylindrical brake drums, back-plates over an open end of said drum secured to fixed axles on which said system is carried, internal expanding brake shoes adapted to engage and to be retracted from said drums and limited elasticity connecting links secured respectively to one of said shoes and one of said backing plates for determining the distance of retraction from the braking position of said shoes, which is characterized by removable means for securing said limited elasticity links to said backing plates, positioned and adapted to be removable from outside the backing plates.

10. A brake system of the type having cylindrical brake drums, back-plates over an open end of said drum secured to axles in which said system is carried, internal expanding brake shoes adapted to engage and to be retracted from said drums and limited elasticity connecting links each secured to one of said shoes and one of said backing plates for determining the distance of retraction from the braking position of said shoes, which is characterized by the limited elasticity connecting links being secured to the backing plates by threaded bolts having one end projecting through the backing plate for engagement with another threaded member, the projecting member being rotatable from outside said backing plate to release said bolt and the other threaded member being held against rotation while the projecting member is unscrewed.

11. A brake system of the type having cylindrical brake drums, back-plates over an open end of said drum secured to fixed axles on which said system is carried, internal expanding brake shoes adapted to engage and to be retracted from said drums and limited elasticity connecting links secured respectively to one of said shoes and one of said backing plates for determining the distance of retraction from the braking position of said shoes, which is characterized by said links extending through said backing plate and being secured thereto on its outer side, whereby to be subjected to substantially the same external influences as said drums, and to be releasable from the backing plates from the outside thereof.

12. In a brake system, the combination as defined in claim 1, which further comprises means for contracting the ratchet positioned and adapted for operation from outside the system through said frame.

GEORGE S. LANE.